March 2, 1965     M. H. BERNSTEIN     3,172,039
OSCILLOSCOPE TESTING APPARATUS INCLUDING
A REFERENCE WAVEFORM DISPLAY DEVICE
Filed Dec. 3, 1959
FIG. 1
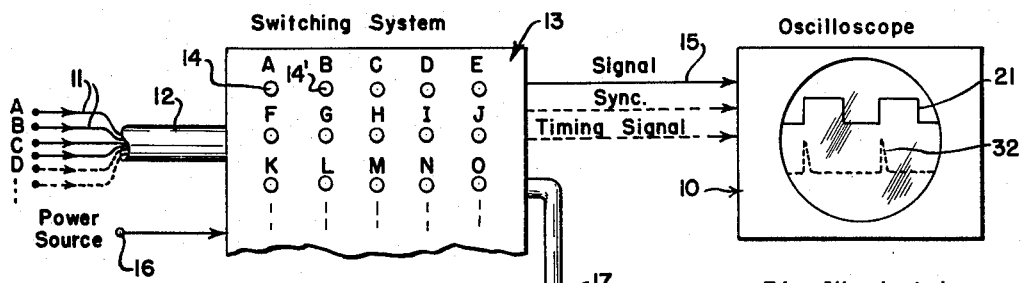
FIG. 2
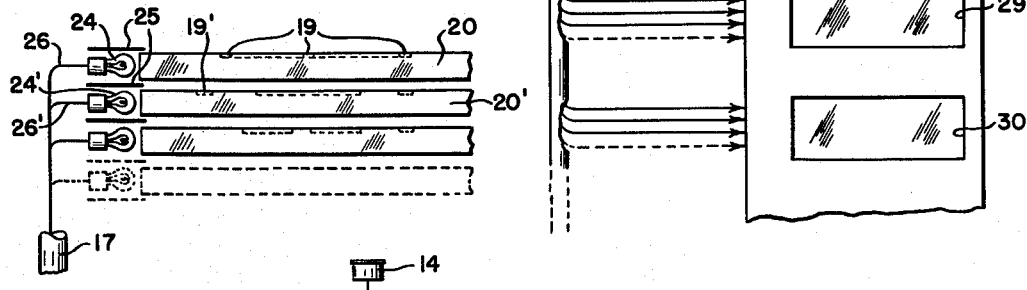
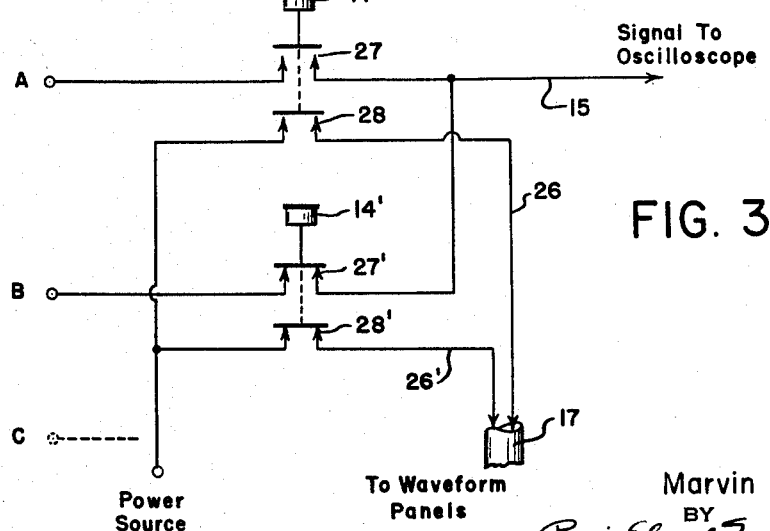
FIG. 3
INVENTOR
Marvin H. Bernstein
BY
ATTORNEYS //  # United States Patent Office 3,172,039
Patented Mar. 2, 1965

3,172,039
OSCILLOSCOPE TESTING APPARATUS INCLUDING A REFERENCE WAVEFORM DISPLAY DEVICE
Marvin H. Bernstein, Brooklyn, N.Y., assignor to the United States of America as represented by the Secretary of the Army
Filed Dec. 3, 1959, Ser. No. 857,207
3 Claims. (Cl. 324—73)

This invention relates to apparatus for checking electrical waveforms and more particularly to oscilloscope testing apparatus including a reference waveform display device.

Oscilloscopes are commonly used to check the electrical waveforms present at various points in electronic systems for service or maintenance purposes. In a complex electronic system the waveforms at many points must be checked in order to ascertain whether all parts of the system are functioning properly, or to locate a source of mal-functioning. Sometimes maintenance manuals are prepared illustrating the waveforms which should be observed at various test-points in the system so as to facilitate checking. When a considerable number of points must be checked, the procedure can be quite tedious and time-consuming, and subject to human error if the oscilloscope display is compared with the wrong waveform in the manual.

It is a primary object of the present invention to provide oscilloscope apparatus for checking electrical waveforms at various test-points in an electronic system both expeditiously and accurately.

In accordance with the invention, a display unit is provided including a plurality of pre-recorded pictorial representations of reference waveforms corresponding to the waveforms which should be observed at various test-points. The display unit is designed to display selectively a desired reference waveform to the substantial exclusion of the others. Then means are provided for selectively switching the input of the oscilloscope to a desired test-point and simultaneously displaying the particular reference waveforms corresponding to that test-point. As the oscilloscope is switched to different test-points, the display unit is simultaneously actuated to display selectively the proper reference waveforms.

The display unit is advantageously mounted near the oscilloscope to thereby provide a convenient means for comparing, on a point-by-point basis, the actual operating waveforms with the reference waveforms.

In a preferred embodiment each reference waveform is inscribed on a separate transparent panel and a plurality of panels are stacked in overlying relationship to provide a compact assembly. Provision is made to edge-illuminate the panels one at a time. A selective switching system is then provided for connecting the oscilloscope input to any one of many desired test-points. At the same time the switching system selectively illuminates the appropriate individual reference waveform panel, thereby displaying only the waveform corresponding to the point being checked. Additional switching contacts may be provided in the switching system for simultaneously switching synchronizing pulses to the oscilloscope sweep circuit, and for displaying precision timing markers, etc.

The invention will be described in connection with a preferred embodiment thereof, taking in conjunction with the drawings in which:

FIG. 1 is a block diagram of waveform-checking apparatus in accordance with the invention;

FIG. 2 is a fragmentary edge view showing a plurality of edge-illuminated waveform panels as used in the apparatus of FIG. 1; and FIG. 3 is a fragmentary schematic wiring diagram of the apparatus of FIG. 1.

Referring to FIG. 1, an oscilloscope 10 is provided to measure the operating electrical waveforms (voltage or current as a function of time) at a plurality of test-points A-D, etc. in the apparatus to be checked. Although only four test-points are lettered, it will be understood that many more can be accommodated, as indicated by dotted lines. The test-points are individually connected via separate conductors 11 in cable 12 to a switching unit 13 containing a plurality of switches operated by push-buttons 14, 14', etc. A separate switch is here provided for each desired point to be tested, and the switches are advantageously interlocked so that only one switch can be depressed or closed at a given time.

Each push-button actuates a pair of ganged single-pole single-throw switches, with one switch functioning to connect a desired test-point (e.g. A) via conductor 15 to the oscilloscope input (e.g. its vertical amplifier) and the other functioning to supply power from input 16 through conductor cable 17 to illuminate the appropriate waveform display panel in display unit 18. Thus, as shown, a reference wave 19 is displayed on display panel 20 corresponding to the electrical wave 21 displayed on the oscilloscope. Display panel 20 is one of a plurality of individual waveform panels which are mounted in the display unit 18.

As shown in FIG. 2, in the preferred embodiment of the display unit individual waveforms 19, 19', etc. are inscribed as by engraving on the surfaces of transparent panels 20, 20', etc. The panels are advantageously made of transparent plastic sheet material. A plurality of panels are stacked in overlying relationship to form a single group assembly which is mounted behind a single window 23 of the display unit shown in FIG. 1. Individual lamps 24, 24', etc. are provided to edge-illuminate respective waveform panels and light shields 25 are provided to direct and confine illumination of each lamp to the respective waveform panel. The lamps are selectively energized by the switching system, as described above, through conductors 26, 26', etc. and only a single panel is illuminated at any given time. Thus, only the single waveform inscribed on the individual panel which is illuminated is visible. Waveforms on the unilluminated panels mounted above and below the illuminated panel remain invisible to the operator. When an appropriate number of panels have been stacked in one group assembly, additional group assemblies may be built and mounted behind windows 29, 30, etc.

It will be apparent to those skilled in the art that one of the outstanding advantages of the display unit described above lies in the overall assembly compactness. In a practical working model ten panels have been satisfactorily combined in a group assembly, thereby making it possible to display selectively ten different waveforms through each window of the display unit. It is apparent that this preferred embodiment makes it possible to display several hundred different waveforms through a multiple windowed unit the face of which is comparable in dimensions to those of the front panel of a typical oscilloscope. Such a display unit can be mounted adjacent to the companion oscilloscope, thereby providing a convenient and expedient means for rapidly checking through the many key test-points of a complex electronic system to determine performance status. The apparatus provided by this invention is particularly useful for making performance tests on computers, radar systems and the like.

A schematic diagram of the switching system is shown in FIG. 3. Here two separate push-buttons 14, 14' are shown each having two ganged switches 27, 28 and 27', 28'. Switches 27, 27' are connected as shown to selectively connect either input A or input B to the oscillo- shown each having two ganged switches 27, 28 and 27', function to selectively connect the power source via conductors 26, 26' to the reference waveform lamps corresponding to input A or B, respectively. In the drawing push button 14' is shown depressed and the waveform appearing at test-point B will be displayed on the oscilloscope and the corresponding reference waveform illuminated in the display unit.

Only two push-button switches are shown in FIG. 3, but the manner of adding any desired number will be clear to those in the art. All push-button switches are preferably mechanically interlocked so that only one switch can be depressed or closed at a given time.

It will be apparent to those skilled in the art that other switching systems may be employed providing equivalent results. For example, multiple contact switching relays may be employed advantageously in certain instances to perform the actual signal switching, with the push-button switches serving to actuate the relays. In certain instances multiple-position rotary-type switches may prove to be useful for performing the switching operations described above.

In the switching diagram shown in FIG. 3 switches are provided for signal switching and lamp power switching. In many installations it may be desirable to switch simultaneously an appropriate synchronizing pulse to the oscilloscope along with each test-point signal. In such case an additional ganged switch may be provided for each push-button to effect the desired sync switching as indicated in FIG. 1. In some instances it may also be desirable to provide a fourth set of ganged switches to effect the switching of precision timing pulses 32 shown dotted on the oscilloscope face in FIG. 1. These pulses may be displayed advantageously on the second beam of a dual-trace oscilloscope to measure pulse time intervals, time delays, etc.

While the present invention has been disclosed with reference to a single preferred embodiment, it will be apparent to those skilled in the art that numerous variations and modifications are possible within the spirit and scope of the invention.

I claim:

1. Apparatus for checking electrical waveforms appearing at a plurality of test-points in an electronic system comprising an oscilloscope for displaying said electrical waveforms, display means including a plurality of display panels for displaying reference waveforms corresponding to said test-point electrical waveforms, each of said panels being adapted when illuminated to display an individual reference waveform, a plurality of energizable lamps equal to the number of display panels, each lamp being capable of illuminating a particular display panel, a power source for energizing said lamps, and double-pole switch means for selectively switching the input of said oscilloscope to any one of said test-points and for a simultaneously switching said power source to the lamp associated with the waveform panel corresponding to the selected test-point.

2. Apparatus for checking electrical wavveforms appearing at a plurality of test-points in an electronic system comprising an oscilloscope for displaying said electrical waveforms, display means for displaying reference waveforms corresponding to said test-point electrical waveforms including a plurality of transparent panels stacked in overlying relationship, each of said panels having an individual reference waveform inscribed thereon, energizable means for separately edge-illuminating each of said panels, and a plurality of double-pole switches equal to the number of said test-points, one pole of each of said switches being adapted to connect a signal from its corresponding test-point to the input of said oscilloscope and the other pole of each of said switches being adapted to edge-illuminate the waveform panel corresponding to the selected test point.

3. Apparatus for checking electrical waveforms appearing at a plurality of test-points in an electronic system comprising an oscilloscope for displaying said electrical waveforms, display means for displaying reference waveforms corresponding to said test-point electrical waveforms including a plurality of transparent panels stacked in overlying relationship, each of said panels being adapted to display an individual reference waveform when the panel is edge-illuminated, a plurality of energizable lamps equal to the number of display panels, each lamp being capable of edge-illuminating a particular display panel, a power supply for energizing said lamps, a plurality of actuator means and switch means responsive to one of said actuator means for selectively switching the input of said oscilloscope to any one of said test-points and for simultaneously connecting said power supply to the lamp associated with the waveform panel corresponding to the selected test-point.

References Cited by the Examiner
UNITED STATES PATENTS

| | | | |
|---|---|---|---|
| 2,171,216 | 8/39 | Koch | 324—73 |
| 2,446,674 | 8/48 | Sproul | 340—80 |
| 2,586,743 | 2/52 | Thresher | 178—7.83 |
| 2,963,652 | 12/60 | Taylor et al. | 324—158 |

WALTER L. CARLSON, *Primary Examiner.*
SAMUEL BERNSTEIN, *Examiner.*